(12) United States Patent
Kobayashi et al.

(10) Patent No.: US 10,899,933 B2
(45) Date of Patent: Jan. 26, 2021

(54) ANTIFOULING STRUCTURE

(71) Applicant: NISSAN MOTOR CO., LTD., Yokohama (JP)

(72) Inventors: Ryota Kobayashi, Kanagawa (JP); Yuji Noguchi, Kanagawa (JP); Ryo Murakami, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/332,474

(22) PCT Filed: Sep. 13, 2016

(86) PCT No.: PCT/JP2016/076972
§ 371 (c)(1),
(2) Date: Mar. 12, 2019

(87) PCT Pub. No.: WO2018/051410
PCT Pub. Date: Mar. 22, 2018

(65) Prior Publication Data
US 2019/0345342 A1 Nov. 14, 2019

(51) Int. Cl.
*C09D 5/00* (2006.01)
*C09D 7/40* (2018.01)
(Continued)

(52) U.S. Cl.
CPC ............... *C09D 5/00* (2013.01); *C09D 5/16* (2013.01); *C09D 5/1637* (2013.01);
(Continued)

(58) Field of Classification Search
CPC .......... C09D 5/00; C09D 5/1656; C09D 5/16; C09D 127/12; Y10T 428/249991; Y10T 428/249969; Y10T 428/249956
See application file for complete search history.

(56) References Cited

U.S. PATENT DOCUMENTS 5,076,674 A 12/1991 Lynam
6,410,626 B1 6/2002 Wada et al.
(Continued)

FOREIGN PATENT DOCUMENTS

CN 103649240 A 3/2014
EP 3 326 806 A1 5/2018
(Continued)

OTHER PUBLICATIONS

Hampton Research User Guide "Polyfluoropolyether cryo oil user guide"; http://hamptonresearch.com/documents/product/hr004360_hr2-814_user_guide.pdf (Year: 2013).
(Continued)

*Primary Examiner* — Hai Vo
(74) *Attorney, Agent, or Firm* — Foley & Lardner LLP

(57) ABSTRACT

An antifouling structure of the present invention includes: a non-volatile liquid; a microporous structure layer retaining the non-volatile liquid; and a base with the microporous structure layer on a surface of the base.
A surface roughness (Rz) of the microporous structure layer and a film thickness (T) of the non-volatile liquid satisfy Rz<T.
The automobile part with an antifouling structure of the present invention includes the above-described antifouling structure.

9 Claims, 4 Drawing Sheets

(51) Int. Cl.
  *C09D 5/16* (2006.01)
  *C09D 127/12* (2006.01)
  *C09D 171/02* (2006.01)
  *B62D 29/04* (2006.01)

(52) U.S. Cl.
  CPC ............ *C09D 5/1656* (2013.01); *C09D 7/67* (2018.01); *C09D 127/12* (2013.01); *C09D 171/02* (2013.01); *B62D 29/043* (2013.01); *Y10T 428/249956* (2015.04); *Y10T 428/249969* (2015.04); *Y10T 428/249991* (2015.04)

(56) References Cited

U.S. PATENT DOCUMENTS

| | | | |
|---|---|---|---|
| 2004/0185268 | A1 | 9/2004 | Kumar et al. |
| 2011/0019277 | A1 | 1/2011 | Sager et al. |
| 2013/0032316 | A1 | 2/2013 | Dhiman et al. |
| 2013/0034695 | A1 | 2/2013 | Smith et al. |
| 2013/0302598 | A1 | 11/2013 | Haraguchi et al. |
| 2014/0147627 | A1* | 5/2014 | Aizenberg ............... A61L 15/24 428/141 |
| 2014/0290731 | A1 | 10/2014 | Aizenberg et al. |
| 2014/0290732 | A1* | 10/2014 | Aizenberg ............. B05D 3/002 136/256 |
| 2016/0107928 | A1* | 4/2016 | Bayne .................... C03C 17/09 428/429 |
| 2017/0015835 | A1 | 1/2017 | Aizenberg et al. |
| 2018/0002535 | A1* | 1/2018 | Chen ........................ C09D 5/00 |
| 2018/0127594 | A1 | 5/2018 | Aizenberg et al. |
| 2018/0180364 | A1 | 6/2018 | Dhiman et al. |
| 2018/0187022 | A1 | 7/2018 | Aizenberg et al. |
| 2018/0326709 | A1* | 11/2018 | Noguchi .................. B32B 5/18 |
| 2019/0023608 | A1* | 1/2019 | Brudieu ................ C03C 17/009 |

FOREIGN PATENT DOCUMENTS

| | | |
|---|---|---|
| EP | 3 459 728 A1 | 3/2019 |
| JP | 04-270649 | 9/1992 |
| JP | 2004-038075 A | 2/2004 |
| JP | 2005-112911 A | 4/2005 |
| JP | 2010-174079 A | 8/2010 |
| JP | 2014-509959 A | 4/2014 |
| JP | 2014-079920 A | 5/2014 |
| JP | 2014-153684 A | 8/2014 |
| JP | 2014-531989 A | 12/2014 |
| JP | 2015-063061 A | 4/2015 |
| JP | 2015-063068 A | 4/2015 |
| JP | 2015-066849 A | 4/2015 |
| JP | 2015-214072 A | 12/2015 |
| JP | 2016-144877 A | 8/2016 |
| WO | WO-2008/120505 A1 | 10/2008 |
| WO | WO-2009/066630 A1 | 5/2009 |
| WO | WO-2010/101250 A | 9/2010 |
| WO | WO-2012/100099 A2 | 7/2012 |
| WO | WO-2012/100100 A2 | 7/2012 |
| WO | WO-2012/100100 A3 | 7/2012 |
| WO | WO-2015/145703 A1 | 10/2015 |
| WO | WO-2015/155830 A1 | 10/2015 |

OTHER PUBLICATIONS

Shin Etsu Global website product data; https://www.shinetsusilicone-global.com/products/type/oil/detail/search/deg 14.shtml (Year: 2019).

USPTO Office Action, U.S. Appl. No. 15/745,319 dated Nov. 26, 2019, 13 pages.

USPTO Office Action, U.S. Appl. No. 15/745,319, dated Mar. 19, 2020, 13 pages.

* cited by examiner

ANTIFOULING STRUCTURE

TECHNICAL FIELD

The present invention relates to an antifouling structure. In more detail, the present invention relates to an antifouling structure with high antifouling performance and high visibility.

BACKGROUND ART

A type of water-repellant articles that has been known in the art includes a void layer that has a void structure with voids impregnated with a water repellent material.

Patent Document 1 discloses a water-repellent article that is produced by forming a void layer having a void structure substantially made of an inorganic material and thereafter impregnating voids of the void layer with a water-repellent material.

The water-repellent article can reduce the amount of water-repellent material exposed on the surface to a minimum level since the water-repellent material penetrates in the voids.

Since the void layer is made of the inorganic material, the surface is always supplied with the water-repellent material that exudes from the void layer even when the water-repellent material is damaged or removed. Therefore, the water repellency and the water slipperiness (water droplet sliding property) can be maintained at a high level for a long time.

CITATION LIST

Patent Document

Patent Document 1: WO 2008/120505A

SUMMARY OF INVENTION

Technical Problem

However, since the article of Patent Document 1 reduces the amount of water-repellent material exposed on the surface to a minimum level, thin film of the water-repellent material on the surface of the void layer, which is formed by the water-repellent material that exudes from the void layer, is readily broken so that the void layer is exposed.

Therefore, foreign matter such as droplets are likely to stay on the part where the void layer is exposed, and the above-described water-repellent article does not have sufficient water repellency and water slipperiness over the entire surface of the water-repellent article.

The present invention has been made in view of the problem in the prior art, and an object thereof is to provide an antifouling structure that has good antifouling property and that does not have any part where foreign matter such as droplets is likely to stay.

Solution to Problem

The antifouling structure of the present invention includes a non-volatile liquid, a microporous structure layer that retains the non-volatile liquid, and a base with the microporous structure layer on the surface.

Further, the non-volatile liquid does not include a surface modifier of the microporous structure, and the surface roughness (Rz) of the microporous structure layer and a film thickness (T) of the non-volatile liquid satisfy Rz<T.

An automobile part with an antifouling structure of the present invention includes the above-described antifouling structure.

Advantageous Effects of Invention

With the present invention, the microporous structure layer is prevented from being exposed since the non-volatile liquid covers the surface of the microporous structure layer retaining the non-volatile liquid. Therefore, it is possible to provide an antifouling structure that has good antifouling property and that does not have any part where foreign matter such as droplets is likely to stay.

DESCRIPTION OF THE EMBODIMENTS

An antifouling structure of the present invention will be described.

Figure 1:
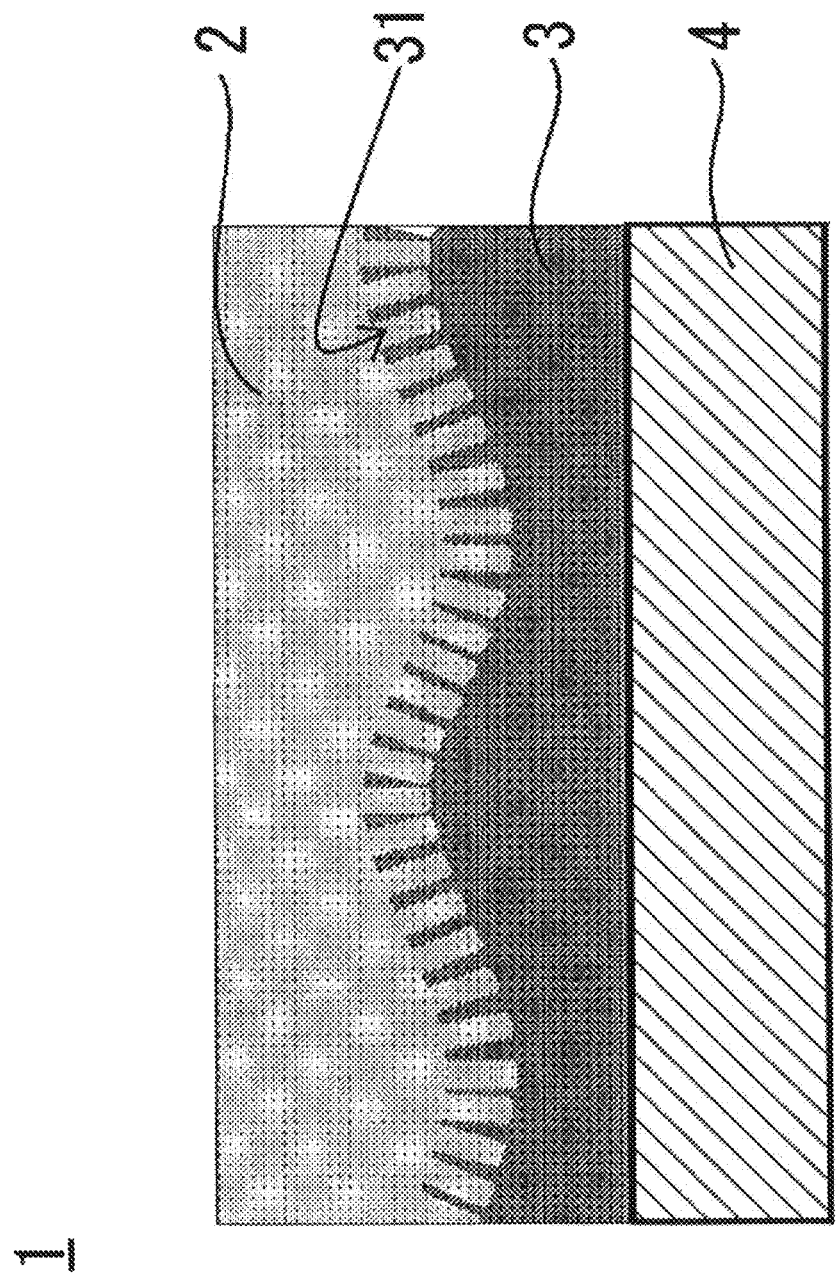
FIG. 1 is a schematic cross-sectional view of an example of the antifouling structure of the present invention.

As illustrated in FIG. 1, the antifouling structure includes a non-volatile liquid 2, a microporous structure layer 3 retaining the non-volatile liquid 2 and a base 4 with the microporous structure layer 3 on the surface.

In the antifouling structure, a surface roughness (Rz) of the microporous structure layer and a film thickness (T) of the non-volatile liquid satisfy Rz<T, and the surface of the microporous structure layer is covered with the non-volatile liquid.

Since the non-volatile liquid forms a smooth surface over the entire outermost surface in a molecule level, the antifouling structure 1 does not have any part on which foreign matter such as droplets is likely to stay and exhibits good antifouling property over the entire surface.

It is more preferred that the film thickness (T) of the non-volatile liquid satisfies Rz+2 (nm)<T (nm). When the film thickness (T) of the non-volatile liquid is greater than the surface roughness Rz by over 2 nm, the antifouling property is improved.

In the present invention, the surface roughness (Rz) of the microporous structure layer is measured with an atomic force microscope (AFM).

Figure 2:
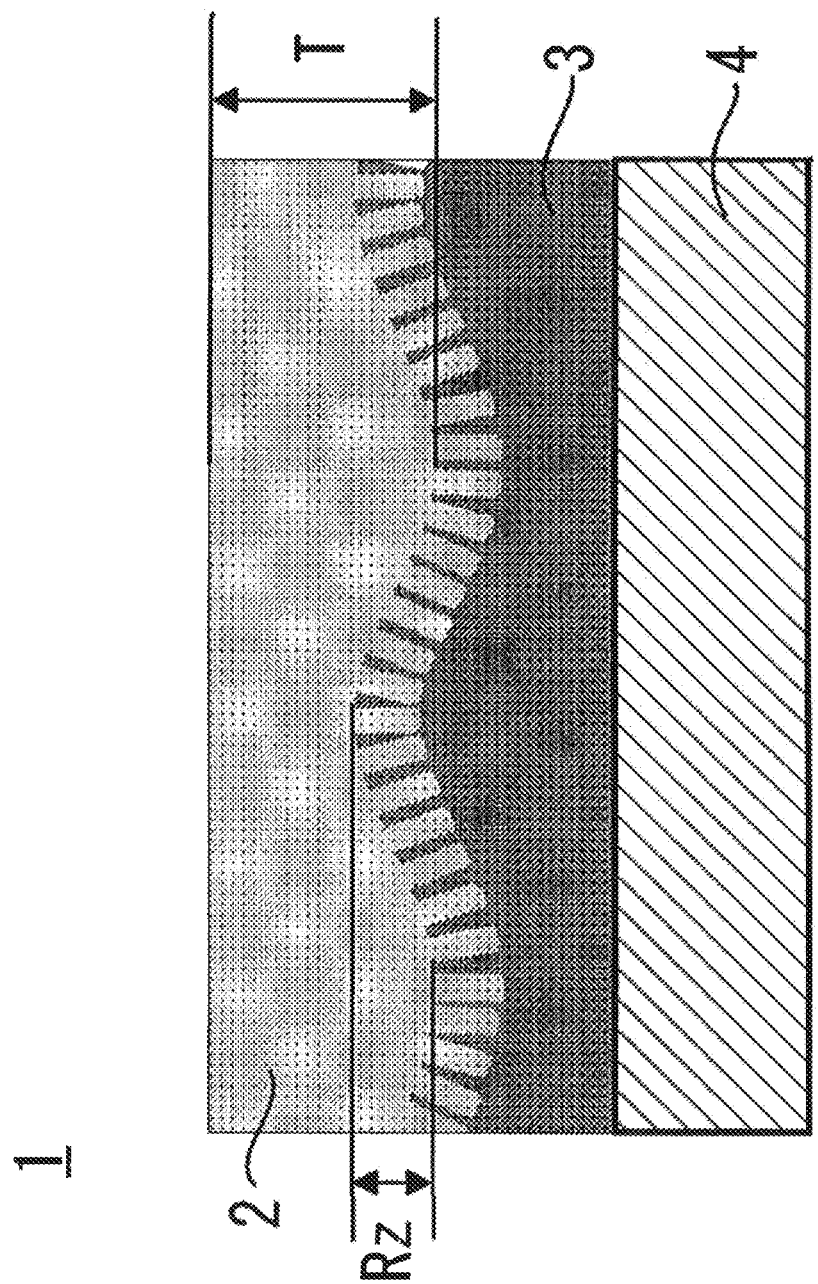
FIG. 2 illustrates the surface roughness (Rz) and a film thickness (T) of non-volatile liquid.

As illustrated in FIG. 2, the surface roughness (Rz) does not represent the micro uneven shape that is formed by pores 31 of the microporous structure which a cantilever of the atomic force microscope does not reach. Instead, the surface roughness (Rz) represents the uneven shape that is detectable with the cantilever.

In the present invention, the surface roughness (Rz) was measured in the following conditions.

Device name: NANOSCOPE IIIa (Bruker AXS GmbH)+D3100

Probe: OMCL-AC160TS (Olympus Corp.)

Measuring condition: tapping mode AFM, 3×3 μm area

In the present invention, as illustrated in FIG. 2, the film thickness (T) of the non-volatile liquid does not include the pores 31 of the microporous structure layer but represents the thickness from the outermost surface of the antifouling structure to a bottom of the uneven shape excluding the pores of the microporous structure layer measured as the surface roughness (Rz)

In the present invention, the film thickness (T) is measured in the following conditions.

Measuring device: VASE (Variable Angle Spectroscopic Ellipsometer)

Measuring condition: (wavelength: 300 nm to 1800 nm)

The upper limit of the film thickness of the non-volatile liquid is preferably equal to or less than 500 nm, more preferably equal to or less than 300 nm. When the film thickness (T) of the non-volatile liquid is within these ranges, both good optical properties and high antifouling performance can be achieved.

When the film thickness (T) of the non-volatile liquid is equal to or less than 500 nm, distortion of a transmission image through the antifouling structure due to refraction of light can be prevented. Further, when the film thickness (T) of the non-volatile liquid is equal to or less than 300 nm, an occurrence of halation or an interference fringe pattern due to light scattering or the like can be prevented.

Microporous Structure Layer

The microporous structure layer 3 is a so-called sponge-like structure in which the interconnected pores 31 are three-dimensionally disposed in a random pattern. The microporous structure layer 3 has affinity for the non-volatile liquid 2 (described later) and retains the non-volatile liquid 2 in the pores and/or on the surface.

The surface roughness (Rz) of the microporous structure layer is preferably equal to or less than 100 nm. When Rz is equal to or less than 100 nm, the visibility is improved since light scattering by the microporous structure layer is reduced. Further, the non-volatile liquid can be supplied from the inside of the microporous structure layer by capillary action and the like to cover the surface of the microporous structure layer so as to form the smooth surface of the non-volatile liquid.

The lower limit of the surface roughness (Rz) of the microporous structure layer is not particularly limited. However, when the surface is completely smooth, it is difficult to maintain the film thickness of the non-volatile liquid since the non-volatile liquid is readily removed. Therefore, the substantial lower limit is approximately 30 nm.

It is preferred that the microporous structure layer is made of a silicon oxide-based inorganic material. When the microporous structure layer is made of an inorganic material that contains hard silicon oxide, it has improved resistance to sliding abrasion. This improves the durability of the antifouling structure.

The microporous structure layer may be made of any inorganic material that has high optical transparency. Examples of such materials include silica glass, soda glass, borosilicate glass and the like that contain 60 wt % or more of silicon oxide ($SiO_2$).

An average film thickness of the microporous structure layer is preferably within the range of 50 nm to 1000 nm. When the average film thickness of the microporous structure layer is equal to or greater than 50 nm, the microporous structure layer can sufficiently retain the non-volatile liquid. This improves the durability of the antifouling structure.

When the average film thickness is equal to or less than 1000 nm, generation of cracks due to volume shrinkage and the like can be prevented in the production of the microporous structure layer. This can prevent an increase of the haze due to such cracks and the like and thereby improve the visibility.

The average film thickness (h) of the microporous structure layer is determined by photographing a cross section of the microporous structure layer with a scanning electron microscope (SEM), analyzing the image to measure the film thickness of the microporous structure layer at two or more points in a microscopic field and calculating the average thereof.

The average diameter (r) of the pores of the microporous structure layer is preferably 10 nm or more to 100 nm or less. When the average diameter of the pores is equal to or greater than 10 nm, the non-volatile liquid such as fluorinated oil can penetrate into the pores of the microporous structure layer to be retained in the microporous structure layer.

When the average diameter of the pores is equal to or less than 100 nm, an increase of the haze due to Rayleigh scattering and the like can be prevented. This can prevent a decrease of the parallel light transmittance.

Further, the film thickness of the non-volatile liquid can be increased by capillary action and the like. This facilitates the non-volatile liquid to cover the surface of the microporous structure layer to form a smooth surface.

The average diameter of the pores is determined by photographing the surface of the microporous structure layer from above with a scanning electron microscope (SEM), measuring the area of openings of pores in a microscopic field by image analysis and calculating the average diameter of circles having the same area as the openings of the pores.

For example, the average pore size can be adjusted by changing the time immediately after applying the raw material of the microporous structure layer onto a base until the microporous structure layer is dried by heat in the production of the microporous structure layer or by changing the applying film thickness in the production of the microporous structure layer.

Specifically, it is possible to increase the average pore size of the microporous structure layer by extending the time after coating until the microporous structure layer is dried by heat or by increasing the applying film thickness in the production of the microporous structure layer.

It is preferred that the surface and the pores of the microporous structure layer are modified with a modifier. Modifying the microporous structure layer can reduce the surface energy of the microporous structure layer. This allows the non-volatile liquid to sufficiently spread and wet the surface of the microporous structure layer to form a smooth surface of the non-volatile liquid by capillary action.

Modifiers that can be used include modifiers that contain a compound having a fluoride functional group that can bind to the inorganic material of the microporous structure layer. Such compounds having a fluoride functional group include fluorinated silane coupling agents known in the art such as alkoxyoligomers having a fluoride functional group.

Non-Volatile Liquid

The non-volatile liquid 2 spreads and wets the surface of the microporous structure layer 3 to form a smooth surface on the outermost surface of the antifouling structure 1. The non-volatile liquid 2 thereby repels foreign matter such as water, oil, sand and dust to reduce adhesion of the foreign matter.

Non-volatile liquids that can be used include liquids with low surface energy such as fluorinated oils and silicone oils.

Examples of Such fluorinated oils include fluoropolyether oil, perfluoropolyether oil and the like. Preferred are fluorinated oils having fluoropolyether as a main chain.

Such silicone oils include straight-chain or cyclic silicone oils.

Examples of straight-chain silicone oils include so-called straight silicone oils and modified silicone oils. Examples of straight silicone oils include dimethyl silicone oil, methylphenyl silicone oil and methylhydrogen silicone oil.

Examples of modified silicone oils include straight silicone oils that are modified with polyether, higher fatty acid ester, fluoroalkyl, amino, epoxy, carboxyl or alcohol.

Examples of cyclic silicone oils include cyclic dimetylsiloxane oil and the like.

It is preferred that the non-volatile liquid has a viscosity at 0° C. of 160 mm$^2$/s or less, more preferably within the range of 8 mm$^2$/s to 80 mm$^2$/s.

When the viscosity of the non-volatile liquid is equal to or less than 160 mm$^2$/s, the water repellency and the antifouling property can be improved. When the viscosity is equal to or greater than 8 mm$^2$/s, the resistance to loss at high temperature can be improved.

The loss of the non-volatile liquid after heating at 120° C. for 24 hours is preferably less than 35 mass %. When the loss on heating is 35 mass %, the antifouling structure can have high durability.

For example, when the antifouling structure is used in automotive application, the performance is less likely to be deteriorated due to natural evaporation of the non-volatile liquid, and the antifouling structure can maintain good antifouling property at ambient temperature (5° C. to 35° C.) for a long time.

The loss on heating can be determined by spreading 30 g of the non-volatile liquid on a 40 φ petri dish, heating it at 120° C. for 24 hours and measuring the loss.

Base

Bases that can be used as the base 4 may contain an inorganic material such as transparent glass.

Method of Producing Antifouling Structure

To produce the antifouling structure of the present invention, as the first step, the microporous structure layer is formed by a sol-gel method. Specifically, the microporous structure layer can be formed by changing a solution containing the material of the microporous structure layer into a sol by hydrolysis and polymerization, applying the sol onto the base, allowing the reactions to further proceed to change the applied sol into a gel and drying and baking the gel.

The sol can be applied by a method known in the art such as spin coating, spraying, roll coating, flow coating or dip coating.

Then, the surface of the microporous structure layer is modified with a modifier such as the above-described silane coupling agent by a method known in the art such as reflux, vapor deposition or immersion. The microporous structure layer is impregnated with the non-volatile liquid such as fluorinated oil. The antifouling structure of the present invention can thus be produced.

Antifouling Structure

It is preferred that the antifouling structure has a parallel light transmittance (Tp) of 90% or more and a haze (Hz) of 1% or less. When the parallel light transmittance and the haze are within these ranges, the antifouling structure satisfies transparency required for automobile parts and optical parts.

The parallel light transmittance can be measured by setting a sample film in a measurement device with an integrating sphere specified by JIS K7136, emitting light to the front side of the sample and capturing the light that has transmitted the antifouling structure by using the integrating sphere.

The haze was measured according to JIS K7136 with a haze/transmittance meter (Murakami Color Research Laboratory).

Automobile Part with an Antifouling Structure

The automobile part with an antifouling structure of the present invention includes the antifouling structure of the present invention. With the antifouling structure, the automobile part can maintain high antifouling performance for a long time. This allows reducing the frequency of car wash or cleaning and securing a good view in a rain or on a dirt road.

Such automobile parts include camera lenses, mirrors, glass windows, painted surfaces of bodies and the like, various light covers, door handles, meter panels, window panels, radiator fins, evaporators and the like. However, the automobile part is not limited thereto.

EXAMPLES

Hereinafter, the present invention will be described in more detail with examples. However, the present invention is not limited to the following examples.

Preparation of Antifouling Structure Precursor A

Preparation of Microporous Structure Layer

A screw-top tube A charged with 0.64 g of pure water, 1.5 g of triethylene glycol, 0.78 g of isopropyl alcohol and 0.3 g of sulfuric acid, and a screw-top tube B charged with 8.04 g of tetraethoxysilane (ethylsilicate 40, Colcoat Co., Ltd.) and 0.78 g of isopropyl alcohol were heated in a water bath maintained at 25° C.

The materials in the screw-top tube B were transferred to the screw-top tube A, and the mixture was stirred at 1500 rpm. After the temperature in the screw-top tube A reached 30° C. (peak temperature), the mixture was further stirred for 30 minutes.

After the stirring, an aliquot (5.0 g) of the solution in the screw-top tube A was collected to a screw-top tube C. Then, 20 g of isopropyl alcohol was added thereto, and the mixture was stirred at 1500 rpm for 1 minute.

A soda lime glass (100$^2$ mm$^2$), which was treated with plasma at a rate of 1 cm$^2$/s by using a plasma generator, was spin-coated by an aliquot (1.5 ml) of the solution mixed and stirred in the screw-top tube C by using a spin coater (K359D-1 SPINNER, Kyowariken Corp.) at a rotation speed of 100 rpm for 3 seconds, 500 rpm for 5 seconds and then 1000 rpm for 15 seconds.

The spin coating was carried out in the air conditioned at a temperature of 25° C. and a humidity of 60%.

The spin-coated soda lime glass was placed in a flat position and dried with air for 2 minutes and then in a drying oven at 150° C. for 1 hour. Then, the coated soda lime glass was allowed to cool down to room temperature in the drying oven.

Thereafter, the coated soda lime glass was baked in a muffle furnace (FP410, Yamato Scientific Co., Ltd.) at 500° C. for 1 hour and then allowed to cool down to room temperature in the muffle furnace. A microporous structure layer was thus formed on the soda lime glass base.

Surface Modification

A fluorine modifier (FLUOROSURF FG-5020, Fluoro Technology Corp.) was refluxed at a temperature of 60° C. for 2 hours to modify the surface and pores of the microporous structure layer.

The soda lime glass with the modified surface was dried in a drying oven at 150° C. for 1 hour and then allowed to cool to room temperature in the drying oven. Thereafter, the sample was soaked in a fluorine solvent (NOVEC7100, 3M Corp.) and washed with an ultrasonic cleaner (BAKUSEN W-113 Mk-II, Yamato Scientific Co., Ltd) in a BAKUSEN mode (24 kHz and 31 kHz superimposed) for 5 minutes. The "antifouling structure precursor A" was thus obtained.

Preparation of Antifouling Structure Precursor B

Preparation of Microporous Structure Layer

Into a screw-top tube A, 1.04 g of pure water, 1.65 g of triethylene glycol, 0.78 g of isopropyl alcohol, 0.2 g of sulfuric acid were charged. Into a screw-top tube B, 11.25 g of tetraethoxysilane (min. 98%, TEOS, Wako Pure Chemicals, Corp.) and 0.78 g of isopropyl alcohol were charged.

The materials in the screw-top tube B were transferred to the screw-top tube A, and the mixture was stirred at 1500 rpm. The stirring was stopped when the temperature in the screw-top tube A reached 39.9° C. (peak temperature).

An aliquot (5.0 g) of the solution in the screw-top tube A was collected to a screw-top tube C. Then, 20 g of isopropyl alcohol was added thereto, and the mixture was stirred at 1500 rpm for 1 minute.

A plasma-treated soda lime glass ($100^2$ $mm^2$) as described above was spin-coated by an aliquot (1.5 ml) of the solution in the screw-top tube C at a rotation speed of 100 rpm for 3 seconds, 500 rpm for 5 seconds and then 1000 rpm for 15 seconds.

A soda lime glass ($100^2$ $mm^2$), which was treated with plasma at a rate of 1 $cm^2$/s by using a plasma generator, was spin-coated by an aliquot (1.5 ml) of the solution in the screw-top tube C at a rotation speed of 100 rpm for 3 seconds, 500 rpm for 5 seconds and then 1000 rpm for 15 seconds.

The spin-coated soda lime glass was dried in a drying oven at 150° C. for 1 hour and then allowed to cool to room temperature in the drying oven.

Thereafter, the coated soda lime glass was baked in a muffle furnace at 500° C. for 1 hour and then allowed to cool down to room temperature in the muffle furnace. A microporous structure layer was thus formed.

Surface Modification

A fluorine modifier (FLUOROSURF FG-5020, Fluoro Technology Corp.) was refluxed at a temperature of 60° C. for 8 hours to modify the surface and pores of the microporous structure layer.

The soda lime glass with the modified surface was dried in a drying oven at 150° C. for 1 hour and then allowed to cool to room temperature in the drying oven. Thereafter, the sample was soaked in a fluorine solvent (NOVEC7100, 3M Corp.) and washed with an ultrasonic cleaner (BAKUSEN W-113 Mk-II, Yamato Scientific Co., Ltd) in a BAKUSEN mode (24 kHz and 31 kHz superimposed) for 5 minutes. The "antifouling structure precursor B" was thus obtained.

Example 1

An antifouling structure was produced by applying 0.00377 g of a non-volatile liquid (KRYTOX GPL103, DuPont Corp.) onto the "antifouling structure precursor A" and allowing the sample to stand for 1 hour to allow the microporous layer to retain the non-volatile liquid.

Example 2

An antifouling structure was produced by applying 0.00377 g of a non-volatile liquid (KRYTOX GPL103, DuPont Corp.) onto the "antifouling structure precursor B" and allowing the sample to stand for 1 hour to allow the microporous structure layer to retain the non-volatile liquid.

Example 3

An antifouling structure was produced by applying 0.00141 g of a non-volatile liquid (KRYTOX GPL103, DuPont Corp.) onto the "antifouling structure precursor A" and allowing the sample to stand for 1 hour to allow the microporous structure layer to retain the non-volatile liquid.

Example 4

An antifouling structure was produced by applying 0.00094 g of a non-volatile liquid (KRYTOX GPL103, DuPont Corp.) onto the "antifouling structure precursor B" and allowing the sample to stand for 1 hour to allow the microporous structure layer to retain the non-volatile liquid.

Example 5

An antifouling structure was produced by applying 0.00134 g of a non-volatile liquid (KRYTOX GPL103, DuPont Corp.) onto the "antifouling structure precursor A" and allowing the sample to stand for 1 hour to allow the microporous structure layer to retain the non-volatile liquid.

Example 6

An antifouling structure was produced by applying 0.00089 g of non-volatile liquid (KRYTOX GPL103, DuPont Corp.) onto the "antifouling structure precursor B" and allowing the sample to stand for 1 hour to allow the microporous structure layer to retain the non-volatile liquid.

Example 7

An antifouling structure was produced by applying 0.00754 g of non-volatile liquid (KRYTOX GPL103, DuPont Corp.) onto the "antifouling structure precursor A" and allowing the sample to stand for 1 hour to allow the microporous structure layer to retain the non-volatile liquid.

Example 8

An antifouling structure was produced by applying 0.00754 g of non-volatile liquid (KRYTOX GPL103, DuPont Corp.) onto the "antifouling structure precursor B" and allowing the sample to stand for 1 hour to allow the microporous structure layer to retain the non-volatile liquid.

Comparative Example 1

The "antifouling structure precursor A" was used as the antifouling structure without applying any non-volatile liquid.

Comparative Example 2

The "antifouling structure precursor B" was used as the antifouling structure without applying any non-volatile liquid.

Example 9

An antifouling structure was produced by applying 0.0113 g of a non-volatile liquid (KRYTOX GPL103, DuPont Corp.) onto the "antifouling structure precursor A" and allowing the sample to stand for 1 hour to allow the microporous structure layer to retain the non-volatile liquid.

Example 10

An antifouling structure was produced by applying 0.0113 g of a non-volatile liquid (KRYTOX GPL103, DuPont Corp.) onto the "antifouling structure precursor B" and allowing the sample to stand for 1 hour to allow the microporous structure layer to retain the non-volatile liquid.

Example 11

An antifouling structure was produced by applying 0.0151 g of a non-volatile liquid (KRYTOX GPL103, DuPont Corp.) onto the "antifouling structure precursor A" and allowing the sample to stand for 1 hour to allow the microporous structure layer to retain the non-volatile liquid.

Comparative Example 3

An antifouling structure was produced by applying 0.0002 g of non-volatile liquid (KRYTOX GPL103, DuPont Corp.) onto the "antifouling structure precursor A" and allowing the sample to stand for 1 hour to allow the microporous structure layer to retain the non-volatile liquid.

Evaluation of Performance

The antifouling structures of the above-described Example 1 to Example 1 and Comparative Example 1 to Comparative Example 3 were evaluated for the initial performance and the performance after a sliding abrasion resistance test. The evaluation results are shown in Table 1.

Evaluation of Droplet Sliding Property

Figure 3:
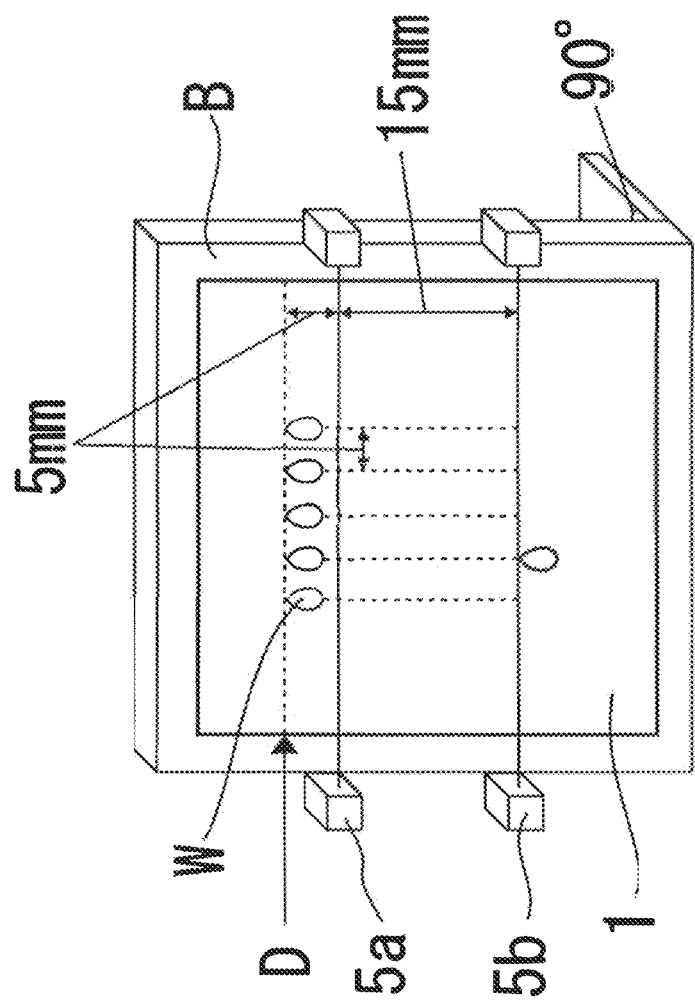
FIG. 3 illustrates a method of evaluating droplet sliding property.

As illustrated in FIG. 3, the droplet sliding property was evaluated by placing each of the antifouling structures in a vertical position, putting a 5-μL droplet of water thereon and measuring the sliding speed of the water droplet W.

To measure the sliding speed of the water droplet W, infrared sensors 5a, 5b are disposed at an interval of 15 mm, one being higher than the other. Five droplets were put at 5-mm intervals in the horizontal direction at a droplet starting height D, which is 5 mm up from the upper infrared sensor. The average sliding speed of the droplets passing through the 15 mm interval was measured, and the average speed of the five droplets was calculated.

Very good: The sliding speed of a water droplet was equal to or greater than 5 mm/sec.

Good: The sliding speed of a water droplet was faster than 0 mm/sec and equal to or slower than 5 mm/sec.

Poor: The sliding speed of a water droplet was 0 mm/sec.

Evaluation of Visibility

Figure 4:
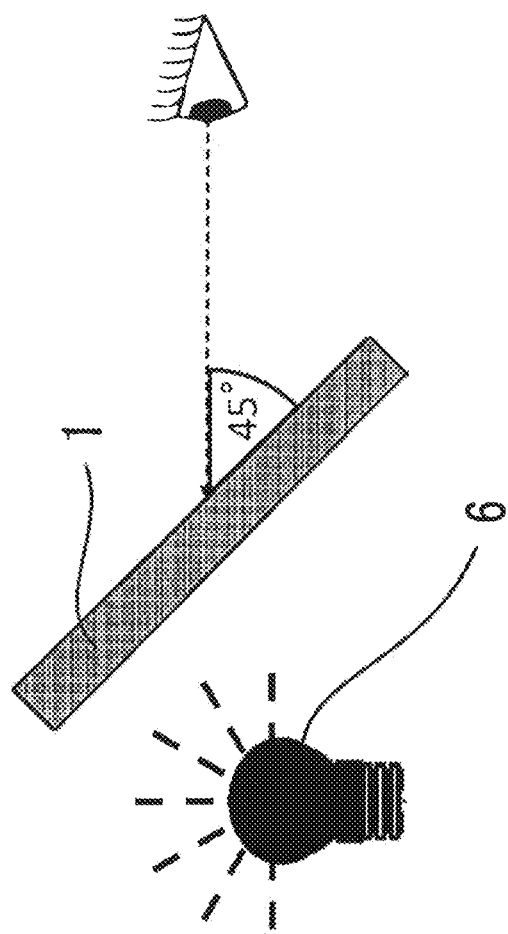
FIG. 4 illustrates a method of evaluating visibility.

As illustrated in FIG. 4, each of the antifouling structures 1 was placed in a position inclined by 45° with respect to the horizontal line. A light source 6 (fluorescent light) was provided ahead and, the visibility was checked by observing from the horizontal line.

Good: An image of the fluorescent light on the surface of the antifouling structure was not distorted, and no interference fringe pattern was observed.

Average: An image of the fluorescent light on the surface of the antifouling structure was not distorted, but an interference fringe pattern was observed.

Poor: An image of the fluorescent light on the surface of the antifouling structure was distorted.

TABLE 1

| Precursor | Film Thickness of Retention Layer (nm) | Pore Size (nm) | Surface Roughness Rz (nm) | Film Thickness of Non-volatile Liquid (nm) |
|---|---|---|---|---|
| Example 1 | Very good | 350 | 33 | 70.2 | 200 |
| Example 2 | Good | 250 | 45 | 46.7 | 200 |
| Example 3 | Very good | 350 | 33 | 70.2 | 75 |
| Example 4 | Good | 250 | 45 | 46.7 | 50 |
| Example 5 | Very good | 350 | 33 | 70.2 | 71 |
| Example 6 | Good | 250 | 45 | 46.7 | 47 |
| Example 7 | Very good | 350 | 33 | 70.2 | 400 |
| Example 8 | Good | 250 | 45 | 46.7 | 400 |
| Comparative Example 1 | Very good | 350 | 33 | 70.2 | 0 |
| Comparative Example 2 | Good | 250 | 45 | 46.7 | 0 |
| Example 9 | Very good | 350 | 33 | 70.2 | 600 |
| Example 10 | Good | 250 | 45 | 46.7 | 600 |
| Example 11 | Very good | 350 | 33 | 70.2 | 800 |
| Comparative Example 3 | Very good | 350 | 33 | 70.2 | 22 |

| | Results of Evaluation | | | |
|---|---|---|---|---|
| | Haze (%) | Parallel Light Transmittance Tp (%) | Antifouling Performance | Visibility |
| Example 1 | 0.4 | 94 | Very good | Good |
| Example 2 | 0.2 | 94 | Very good | Good |
| Example 3 | 0.6 | 93 | Very good | Good |
| Example 4 | 0.2 | 94 | Very good | Good |
| Example 5 | 0.8 | 93 | Good | Good |
| Example 6 | 0.3 | 93 | Good | Good |
| Example 7 | 0.5 | 94 | Very good | Average |
| Example 8 | 0.1 | 94 | Very good | Average |
| Comparative Example 1 | 2.4 | 93 | Poor | Poor |
| Comparative Example 2 | 0.4 | 92 | Poor | Good |
| Example 9 | 0.3 | 94 | Very good | Poor |
| Example 10 | 0.1 | 94 | Very good | Poor |
| Example 11 | 0.4 | 94 | Very good | Poor |
| Comparative Example 3 | 1.8 | 93 | Poor | Poor |

Comparative Example 1 to Comparative Example 3 had poor antifouling property since they did not satisfy surface roughness (Rz)<film thickness (T) of non-volatile liquid.

Example 9 to Example 11 had low visibility since they had a film thickness (T) of the non-volatile liquid of greater than 500 nm.

It was confirmed that Example 1 to Example 4, which satisfy surface roughness (Rz)+2 nm<film thickness (T) of non-volatile liquid and have a film thickness (T) of the non-volatile liquid of 300 nm or less, had both good antifouling property and good visibility at a high level.

REFERENCE SIGNS LIST

1 Antifouling structure
2 Non-volatile liquid
3 Microporous structure layer
31 Pores
4 Base
5a Infrared sensor
5b Infrared sensor
6 Light source
D Droplet starting height
W Water droplet
B Scale

The invention claimed is:

1. An antifouling structure, comprising:
   a non-volatile liquid;
   a microporous structure layer retaining the non-volatile liquid, the microporous structure layer comprising a silicon oxide-based inorganic material; and
   a base with the microporous structure layer on a surface, the base comprising glass,
   wherein the non-volatile liquid comprises fluorinated oil or silicone oil, wherein the microporous structure layer comprises a surface and pores having an average pore diameter (r) of 10 nm to 45 nm, the surface and pores of the microporous structure layer being modified with a surface modifier comprising an alkoxyoligomer having a fluoride functional group, wherein the non-volatile liquid does not include the surface modifier of the microporous structure layer, and a surface roughness (Rz) of the microporous structure layer and a film thickness (T) of the non-volatile liquid satisfy Rz<T,
   wherein the antifouling structure is free of the surface modifier by removing the surface modifier from the microporous structure layer before application of the non-volatile liquid onto the microporous structure layer, such that the surface and pores of the microporous structure layer are in direct contact with the non-volatile liquid,
   wherein the surface roughness (Rz) and the film thickness (T) have units of nanometers (nm),
   wherein the surface roughness (Rz) indicates a surface roughness of the microporous structure layer which excludes a depth of a pore, and
   wherein the surface roughness (Rz) is within the range of 30 nm to 100 nm.

2. The antifouling structure according to claim 1, wherein the film thickness (T) of the non-volatile liquid is equal to or less than 500 nm.

3. The antifouling structure according to claim 1, wherein the film thickness (T) of the non-volatile liquid is equal to or less than 300 nm.

4. The antifouling structure according to claim 1, wherein an average film thickness (h) of the microporous structure layer is within the range of 50 nm to 1000 nm.

5. The antifouling structure according to claim 1, wherein the non-volatile liquid has a loss on heating at 120° C. for 24 hours of less than 35%.

6. The antifouling structure according to claim 1, wherein the non-volatile liquid has a viscosity at 0° C. of 160 mm$^2$/s or less.

7. The antifouling structure according to claim 1, wherein the non-volatile liquid comprises a compound comprising a main chain having perfluoropolyether.

8. The antifouling structure according to claim 1, wherein the base has a parallel light transmittance (Tp) of 90% or more and a haze (Hz) of 1% or less.

9. An automobile part with an antifouling structure, comprising the antifouling structure according to claim 1.

* * * * *